United States Patent
Kelly et al.

(10) Patent No.: US 9,561,915 B2
(45) Date of Patent: Feb. 7, 2017

(54) PRESSURE DIFFERENTIAL PROOFING METHOD FOR PNEUMATIC CONVEYING

(71) Applicant: IPEG, INC., Wilmington, DE (US)

(72) Inventors: Raymond Burteen Kelly, Beaver Falls, PA (US); Keith J. Salamony, Clairton, PA (US); Douglas E. Brewster, Harrisville, PA (US); Robert G. Criswell, Tionesta, PA (US); Jeffrey Bickel, Oil City, PA (US); Jeffrey S. Rickert, Cranberry Township, PA (US); Steven G. Widdowson, Grove City, PA (US)

(73) Assignee: IPEG, Inc., Wilmington, DE (US)

( * ) Notice: Subject to any disclaimer, the term of this patent is extended or adjusted under 35 U.S.C. 154(b) by 0 days.

(21) Appl. No.: 15/072,502

(22) Filed: Mar. 17, 2016

(65) Prior Publication Data

US 2016/0272439 A1   Sep. 22, 2016

Related U.S. Application Data

(60) Provisional application No. 62/135,244, filed on Mar. 19, 2015.

(51) Int. Cl.
*B65G 53/66* (2006.01)
*B65G 53/24* (2006.01)

(52) U.S. Cl.
CPC ............... *B65G 53/66* (2013.01); *B65G 53/24* (2013.01)

(58) Field of Classification Search
CPC .................................................. B65G 53/66
USPC ..... 406/11, 2, 12, 14, 35, 36, 123, 153, 173, 406/181; 110/175; 137/625.11, 561 A; 366/163.2
See application file for complete search history.

(56) References Cited

U.S. PATENT DOCUMENTS

| | | | |
|---|---|---|---|
| 3,231,314 A * | 1/1966 | Cook | A01K 61/02 406/123 |
| 3,802,782 A * | 4/1974 | Natelson | G01N 21/253 137/625.11 |
| 3,954,303 A | 5/1976 | Boring | |
| 4,415,297 A | 11/1983 | Boring | |
| 4,563,112 A * | 1/1986 | Mokuya | B65G 53/30 137/110 |
| 4,793,744 A * | 12/1988 | Montag | A01C 15/04 111/34 |

(Continued)

FOREIGN PATENT DOCUMENTS

CA            1257301         7/1989

*Primary Examiner* — Joseph Dillon, Jr.
(74) *Attorney, Agent, or Firm* — Reed Smith LLP

(57) ABSTRACT

A material handling system. The system includes a plurality of material sources for providing material to be transferred and a plurality of destination locations for receiving material from the material sources, wherein each destination location has a destination valve. The system further includes a distribution mechanism, a plurality of source conveying tubes each connecting a source location to an opening on the distribution mechanism, and a plurality of destination conveying tubes each connecting an opening on the distribution mechanism to a destination location. The system further includes a vacuum source operatively connected to each of the destination valves, a vacuum sensor disposed on each of the source conveying tubes configured to sense a change in pressure in the source conveying tube, and a programmable controller connected to each of the vacuum sensors for determining if a correct connection has been made.

5 Claims, 2 Drawing Sheets

(56) References Cited

U.S. PATENT DOCUMENTS

| | | | | |
|---|---|---|---|---|
| 4,938,848 A | * | 7/1990 | Raines | C25C 3/14 |
| | | | | 204/245 |
| 5,140,516 A | | 8/1992 | Rainville | |
| 5,221,299 A | | 6/1993 | Boring | |
| 5,622,457 A | | 4/1997 | Thiele | |
| 6,776,561 B1 | * | 8/2004 | Yeh | B01F 13/1005 |
| | | | | 141/105 |
| 6,782,835 B2 | * | 8/2004 | Lee | A01C 7/081 |
| | | | | 111/174 |
| 7,168,448 B2 | * | 1/2007 | Schmidt | F28B 1/06 |
| | | | | 137/561 A |
| 7,779,769 B2 | * | 8/2010 | Memory | A01C 7/081 |
| | | | | 111/174 |
| 8,753,432 B2 | | 6/2014 | Maguire | |
| 9,304,510 B2 | | 4/2016 | Hoopes et al. | |
| 2002/0114672 A1 | * | 8/2002 | Isozaki | B65G 53/66 |
| | | | | 406/11 |
| 2007/0022928 A1 | * | 2/2007 | Kowalchuk | A01C 7/082 |
| | | | | 111/175 |
| 2009/0304461 A1 | * | 12/2009 | Strohschein | B65G 53/54 |
| | | | | 406/11 |
| 2012/0266966 A1 | * | 10/2012 | Kretschmer | C10J 3/723 |
| | | | | 137/1 |
| 2013/0211572 A1 | * | 8/2013 | Hoopes | G05B 19/4189 |
| | | | | 700/112 |
| 2013/0299018 A1 | * | 11/2013 | Elliott | F16L 41/03 |
| | | | | 137/561 A |
| 2014/0130887 A1 | * | 5/2014 | Byrne | F04B 11/0008 |
| | | | | 137/15.01 |
| 2014/0326339 A1 | * | 11/2014 | Toner | B01D 21/0087 |
| | | | | 137/561 A |
| 2014/0348597 A1 | | 11/2014 | Moretto | |

* cited by examiner

PRESSURE DIFFERENTIAL PROOFING METHOD FOR PNEUMATIC CONVEYING

CROSS-REFERENCE TO RELATED APPLICATION

This application claims the benefit under 35 U.S.C. §119 (e) of the earlier filing date of U.S. Provisional Patent Application No. 62/135,244 filed on Mar. 19, 2015, the disclosure of which is incorporated by reference herein.

BACKGROUND

This application discloses an invention which is related, generally and in various embodiments to pneumatic conveying. In factories that use pneumatic conveying methods to move material, it is common to have a fantail manifold, sometimes called a selector station, where material sources are connected to material destinations. This selector station is used to select which material is going to be conveyed to what destination. The selector station provides flexibility to permit various destinations to be connected to different sources depending on the material desired at the time. The flexibility of being able to connect various sources to various destinations also allows the undesired effect of connecting the wrong source material to a destination. In prior pneumatic conveying systems, the wrong material is prevented from being connected by radio frequency identification tags, mating connectors, machine vision, and manual inspection. Manual inspection is subject to the same human error that caused the initial problem and the other methods have deficiencies as well. Radio frequency identification tagging techniques are relatively expensive and involve calibration or paring of the mating connections. Mating connectors are reliant on discrete wiring that is subject to breakage. Machine vision proofing is relatively expensive and involves a camera system that is not effective in high ambient lighting conditions. A pneumatic conveying system using machine-identifiable indicia for verifying a physical connection between source locations and destination locations in material handling processes is disclosed in U.S. patent application Ser. No. 13/766,043, filed Feb. 13, 2013, the disclosure of which is incorporated by reference.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
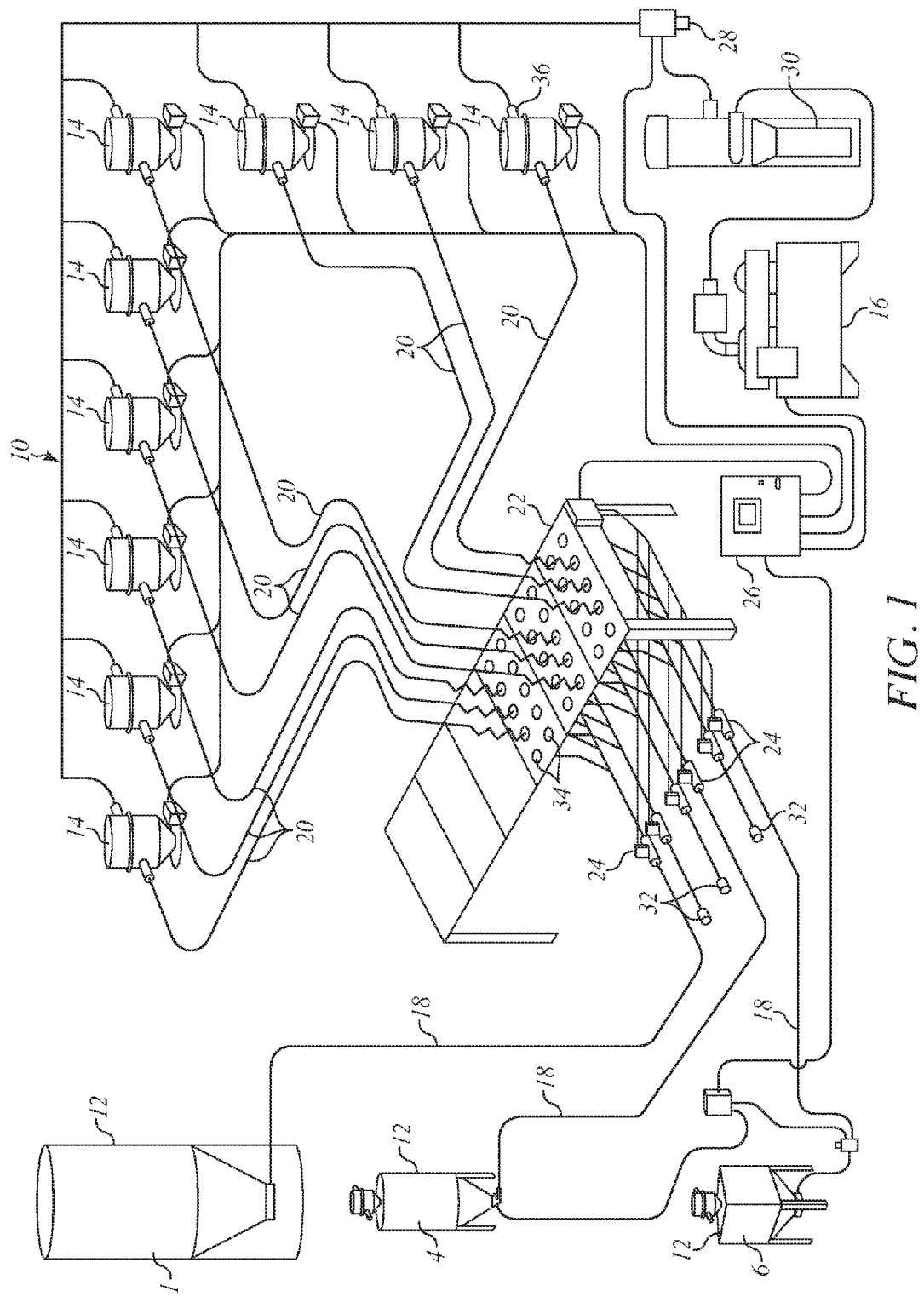
FIG. 1 is a schematic showing various components of one embodiment of the proofing system for pneumatic conveying.

Referring to FIG. 1, one embodiment of the invention system comprises a proofing system for pneumatic conveying 10. In system 10, bulk material is transferred from source locations 12 to destination locations 14 through the use of a vacuum source or pump 16. The bulk material may be in the form of powders, granules, and dry bulk material such as ash, beans, cement, corn cobs, corn, corn flakes, plastics, sand, and wheat. The source locations 12 may be one or more drums, bins, silos, or other vessels that hold or delivers source material. The destination locations 14 may be one or more hoppers or loaders intended to receive source material. The material travels from a selected source location 12 to a selected destination location 14 through conveying tubes 18, 20. Source conveying tubes 18 connect source locations 12 to a distribution mechanism or fantail manifold 22. Destination conveying tubes 20 connect fantail manifold 22 to destination locations 14. Fantail manifold 22 has multiple openings with each of the openings 34 connected to a selected one of the destination locations 14 and with each opening 34 configured to be selectively connected to one of the material sources 12 for selectively directing material from the selected material source 12 to the selected destination location 14.

The system 10 described herein monitors the vacuum or pressure level in all source conveying tubes 18 and through a logic processor 26 determines whether the correct source conveying tube 18 is connected to the correct destination conveying tube 20 by insuring that when the vacuum or pressure is applied through the selected destination location 14, the proper source location 12 also incurs a difference in vacuum or pressure from the ambient. This is accomplished by mounting a sensor 24 in the form of a vacuum sensor or pressure switch on each source conveying tube 18. No additional wiring, components, or modifications are necessary to the destination side of the fantail manifold 22. When the logic processor 26 provides vacuum to a destination valve 36 operatively connected to destination location 14, the vacuum pump 16 is connected to a source 12 through the fantail manifold 22. When the destination location 14 is a loader, the destination valve 36 is preferably located in the loader lid. The vacuum is sensed by the vacuum sensors 24 mounted on the source conveying tubes 18. The vacuum sensors 24 are connected to the logic processor 26 that compares which destination location 14 has the vacuum or pressure applied and which source 12 incurs similar vacuum or pressure. If the correct source 12 has the vacuum or pressure change relative to ambient, the system 10 is permitted to continue to operate. If an incorrect source 12 incurs the vacuum or pressure differential, the logic processor 26 stops the vacuum pump 16 to prevent the system 10 from conveying material, and notifies operators through sound, light, electronic message, or other alarm or error notification means.

Figure 2:
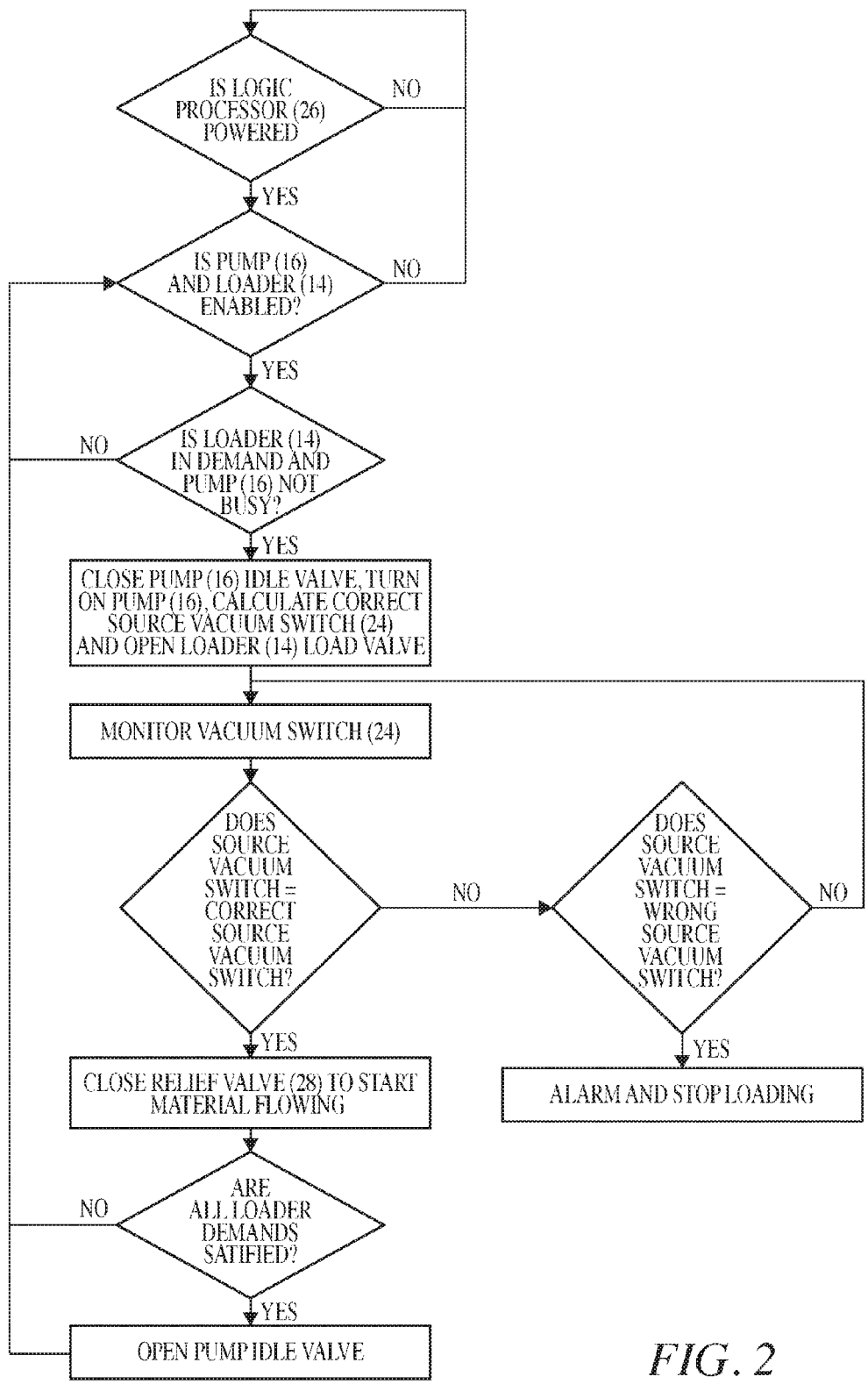
FIG. 2 shows a flow chart depicting the operation of one embodiment of the proofing system for pneumatic conveying.

Referring to FIG. 2, the logic processor 26 is typically the control portion of a complete central loading system including several vacuum pumps 16 with their associated destination locations 14 and many source locations 12. The logic processor 26 coordinates the sharing of source locations 12 with the destination locations 14 in the system. Vacuum pumps 16 are busy when they are servicing other destination locations 14 and source locations 12 are busy when they are being used by other destination locations 14. Destination locations 14 and source locations 12 are enabled in the software of the logic controller 26 which makes them ready to run. Destination locations 14 have demand when their demand sensor is uncovered. Vacuum pumps 16 are not busy when they are idling or not servicing other destination locations 14.

Referring to FIG. 1, system 10 further comprises a relief valve 28 associated with the vacuum pump 16. The relief valve 28 is used to relieve a portion of the vacuum from the source conveying tube 18 until the vacuum sensor 24 determines if the correct connection is made. Only one source conveying tube 18 is connected to the vacuum pump 16 at a time, and that is determined by which destination location 14 has the destination valve 36 open. By partially relieving the vacuum until the connection is proofed, it is possible to prevent the conveyed material from beginning to move and possibly going into the wrong conveying tube 20.

Referring to FIG. 1, system 10 further comprises a dust collector 30. The dust collector 30 separates any dust that is carried through the destination locations 14 from the air before the air goes into the vacuum pump 16. Dust entering the vacuum pump 16 causes maintenance problems and shortens the life of the vacuum pump 16. The spare lines 32 in FIG. 1 represent future expansion. The spare lines 32 could be connected to additional source locations 12 added to the factory in the future. The three source locations 12 are examples of the storage vessels that could be used: source location 12 designated by #1 is a silo typically located outside a building, source location 12 designated by #4 is a drying hopper having a dryer (not shown) connected to it, source location 12 designated by #6 is a surge bin, or an intermediate storage area inside the building, that could be filled from a silo or from boxes of material. Other storage vessels can also be used.

Embodiments of the invention prevent the wrong material from being conveyed to the wrong destination by the addition of vacuum sensors 24 to the source conveying tubes 18 used for conveying material. No additional components are required on the destination side of the fantail manifold 22. The system is less expensive and can be easily retrofit to existing fantail manifolds.

Although the present invention has been described in detail for the purpose of illustration, it is to be understood that such detail is solely for that purpose and that variations can be made therein by those in the art without departing from the spirit and scope of the invention.

What is claimed is:

1. A material handling system, comprising:
a plurality of material sources for providing material to be transferred;
a plurality of destination locations for receiving material from the material sources, wherein each destination location has a destination valve;
a fantail manifold selector plate having multiple openings;
a plurality of source conveying tubes each configured to connect a source to the selector plate;
a plurality of destination conveying tubes each configured to connect a destination location to the selector plate, wherein each of the multiple openings in the selector plate is configured to connect a source conveying tube and a destination conveying tube together;
a vacuum source operatively connected to each of the destination valves, and wherein the vacuum source is operatively connected to the plurality of source conveying tubes through the selector plate and the plurality of destination conveying tubes which are operatively connected to the destination valves on each of the destination locations;
a vacuum sensor disposed on each of the source conveying tubes configured to sense a change in pressure in the source conveying tube;
a programmable controller connected to each of the vacuum sensors and the vacuum source, wherein the programmable controller is configured to determine whether a source conveying tube associated with a selected source has a change in pressure sensed by the vacuum sensor compared to a selected destination location operatively connected to the vacuum source through the destination valve.

2. The system of claim 1, wherein the programmable controller is further configured to stop the vacuum source if a change in pressure is not sensed in the source conveying tube associated with a selected source.

3. The system of claim 2, wherein the programmable controller is further configured to sound an alarm if a change in pressure sensed by is not sensed in the source conveying tube associated with a selected source.

4. The system of claim 1, further comprising a relief valve operatively connected to the vacuum source to relieve a portion of the vacuum from the source conveying tube until the programmable controller determines a correct connection is made with the selected destination location.

5. The system of claim 1, further comprising a dust collector operatively disposed between the plurality of destination locations and the vacuum source.

* * * * *